(12) United States Patent
Oda

(10) Patent No.: US 6,853,837 B1
(45) Date of Patent: Feb. 8, 2005

(54) CDMA RECEIVER AND DCMA DEMODULATOR WITH AGC CIRCUIT

(75) Inventor: Toshiyuki Oda, Tokyo (JP)

(73) Assignee: NEC Corporation, Tokyo (JP)

( * ) Notice: Subject to any disclaimer, the term of this patent is extended or adjusted under 35 U.S.C. 154(b) by 681 days.

(21) Appl. No.: 09/686,090

(22) Filed: Oct. 12, 2000

(30) Foreign Application Priority Data

Oct. 13, 1999 (JP) .......................................... 11/290925

(51) Int. Cl.7 ............................................... H04B 1/06
(52) U.S. Cl. ................................ 455/234.1; 455/242.2; 375/345
(58) Field of Search ........................... 455/234.1, 232.1, 455/242.1, 242.2, 240.1; 325/345; 341/139, 140, 142

(56) References Cited

U.S. PATENT DOCUMENTS

| | | | |
|---|---|---|---|
| 5,617,060 A | * 4/1997 | Wilson et al. | 330/129 |
| 5,974,040 A | * 10/1999 | Kimura | 370/337 |
| 6,038,435 A | * 3/2000 | Zhang | 455/234.1 |
| 6,314,144 B1 | * 11/2001 | Moriyama et al. | 375/316 |
| 6,434,186 B2 | * 8/2002 | Dowling | 375/147 |
| 6,606,490 B1 | * 8/2003 | Rainish et al. | 340/10.34 |

FOREIGN PATENT DOCUMENTS

| | | | |
|---|---|---|---|
| DE | 197 02 280 A1 | 7/1997 | |
| EP | 0 496 507 A2 | 7/1992 | |
| EP | 0 812 064 A2 | 12/1997 | |
| JP | 06-29942 A | 2/1994 | |
| JP | 07094981 | 4/1995 | |
| JP | 08-51330 A | 2/1996 | |
| JP | 08-186456 A | 7/1996 | |
| JP | 08-298682 A | 11/1996 | |
| JP | 09-186735 A | 7/1997 | |
| JP | 10-107765 A | 4/1998 | |
| JP | 10-200353 A | 7/1998 | |
| JP | 10-200353 | * 7/1998 | ............ H03G/3/30 |
| JP | 11-261433 A | 9/1999 | |
| WO | WO 98/35477 A1 | 8/1998 | |

* cited by examiner

*Primary Examiner*—Edward F. Urban
*Assistant Examiner*—Blane J. Jackson
(74) *Attorney, Agent, or Firm*—Sughrue Mion, PLLC

(57) ABSTRACT

A CDMA demodulator is disclosed, which comprises an AGC loop (13 to 20) including a IF signal converter (12) for converting a spread spectrum signal to an IF signal and an AGC amplifier (13) for variable gain amplifying the IF signal with a control voltage. The AGC loop also includes a power level calculating unit (17) for calculating the level of full power in the band of a channel under reception. Desirably, the power level calculating unit (17) starts the power level calculation from an instant corresponding to the forefront of slot. Desirably, the AGC loop further includes a control unit (18), which calculates control time based on the result of calculation in the power level calculating unit and feeds out a control voltage by calculating and controlling the control timing based on control amount. The power level calculating unit may start the power level calculation from an intermediate part of slot instead of the forefront thereof.

14 Claims, 5 Drawing Sheets

CDMA RECEIVER AND DCMA DEMODULATOR WITH AGC CIRCUIT

BACKGROUND OF THE INVENTION

The present invention relates to an AGC (Automatic Gain Control) circuits in CDMA (Code Division Multiple Access) receivers.

As is well known in the art, the CDMA system is one of multiple access system techniques adopted in cellular systems (or mobile communication systems) such as car telephone systems and portable telephone systems, in which communication is performed simultaneously by a plurality of stations in the same frequency band. Well known as other multiple access techniques than the CDMA system are FDMA (Frequency Division Multiple Access) system and TDMA (Time Division Multiple Access) system. Over these other multiple access system techniques, the CDMA system has an advantage in higher frequency utilization efficiency and more user accommodation.

In the CDMA system, the spectrum of data signal to be transmitted is spread in a band sufficiently wide compared to the intrinsic data bandwidth, so that multiple connection is performed by spread spectrum communication.

The cellular system (or mobile communication system) generally includes mobile communication terminals (hereinafter referred to as "mobile stations") MS and a plurality of base stations BS servicing cells. The CDMA system is employed as the third generation Mobile communication system. As hand-over in the case of cross-passing of a CDMA system mobile station MS from one cell to another, soft hand-over is executed, in which radio wave signal from the base station BS before the cross-passing and radio wave signal from the base station MS after the cross-passing are combined.

In such CDMA system, for increasing the subscriber's capacity a power control system is adopted, in which the SIR (signal-to-interference ratio) of receiver input is controlled to be constant. By the term "SIR" is meant the ratio of the level of desired wave received signal power to the level of interference signal power received by the pertinent user from a different user.

As power control system, Japanese Patent No. 2855173 (hereinafter referred to as Prior Art 1) proposes a "CDMA demodulating system", in which the level of received power of pass after despreading is obtained by inserting a pilot signal of a known pattern in signal intermittently at a predetermined cycle frequency.

As further prior art techniques pertaining to the present invention, the following techniques are well known in the art. Japanese Patent Laid-Open No. 9-275361 (hereinafter referred to Prior Art 2) discloses receiver and transmitter, in which waveform distortion of even modulated waves having data in the amplitude is eliminated by instantly forming an AGC loop. In the receiver disclosed in Prior Art 2, a power amplifier amplifies a received signal by an antenna. A variable gain attenuator attenuates the gain of the received signal based on a holder circuit output voltage. A first mixer and a first local oscillator operate together to convert the output signal from the variable gain attenuator to an intermediate frequency signal, and a first band-pass filter limits the band of the intermediate frequency signal. A second local oscillator and a second mixer operate together for further frequency conversion of the first band-pass filter output, and a second band-pass filter limits the band. A limit amplifier limit-amplifies the second band-pass filter output signal, and its out-put is fed to a detector for detection. A comparator obtains a difference voltage between the detector output voltage and a reference voltage. When the difference voltage becomes positive, a timing generator generates a timing signal. Under control of the timing signal, the holder circuit holds the comparator output signal, and the variable gain attenuator attenuates the gain of the received signal based on the holder circuit output signal. A time constant circuit integrates the detector output, and an adder adds together the outputs of the time constant circuit and the holder circuit.

Japanese Patent Laid-Open No. 10-224293 (hereinafter referred to as Prior Art 3) discloses mobile station transmission power level control method and mobile communication system. Prior Art 3 concerns a problem in the prior art. Specifically, in the prior art mobile station transmission power level control, which is performed by a base station, is realized by step-wise control of control amount, which is fixed for each time slot. However, sometimes a long time is taken until the power level is converged to a predetermined level. In Prior Art 3, it is sought to prevent failure of convergence in a communication time particularly in burst communication. Specifically, the power level control executed in the first time slot from the start of communication is performed based on softly changing control amount, while the power level control in the second and following time slot is performed step-wise based on a fixed control amount.

Japanese Patent Disclosure No. 8-2058 (hereinafter referred to as Prior Art 4) discloses an AGC (automatic gain control) system, which is suited for fast and stable AGC in fading circumstances as in mobile communication, when applied to a direct conversion system a time division transmitting/receiving switching system. In Prior Art 3, the signal power level in burst section is detected by making use of a timing signal for time division transmission and reception, and gain control in the next reception time slot is performed based on the detection output. A gain control voltage is set at the start of received burst, and DC off-set can be removed by short-circuiting (or clamping) by short-circuiting the output of a DC block circuit capacitor to ground in a state that any received signal has not yet arrived. It is thus possible to completely remove the advantages of DC off-set variation due to AGC and improve the AGC speed.

However, Prior Art 1 has no mention about the control timing. Depending on the radio wave propagation circumstances, the line quality may be deteriorated by inadequate control timing, and in an extreme case the line may be broken.

Now, inconvenience which may be encountered when the control timing is inadequate will be described with reference to FIGS. 5(a) and 5(b).

It is important to control the control timing. Specifically, the result of calculation of average power level is desirably fed back from an instant corresponding to the forefront of the next slot.

In FIG. 5(a), two successive slots are shown. The first slot is referred to as slot 1, and the next slot is referred to slot 2. A predetermined period of time from the slot forefront is used for power level calculation. In the control shown in FIG. 5(a), the calculated power level in slot 1 is less than a desired level, and it is thus updated to the desired level from the instant corresponding to the forefront of slot 2. This control is ideal. However, such control is actually impossible.

Actually, as shown in FIG. 5(b), the control involves rising time. Accordingly, by taking the rise time into considerations the control is started at an instant earlier than the forefront of slot 2 with an aim of obtaining coincidence of the instant of reaching of a desired voltage with the forefront of slot 2. Control of signal 1 in FIG. 5(b) corresponds to this case.

The control is not started at an indiscriminately earlier instant for the following reason. The transmitting side transmits slots at a constant power level. Therefore, a change in the level of power inputted to the demodulator during a slot results in generation in an demodulation error or like undesired result. It is thus intended to minimize control change during the slot. This is the reason for the above.

However, the amount of control change (i.e., amount of correction) is not fixed. Now, inconvenience which may be encountered unless the control timing is changed will be described.

As an example, a propagation channel having a characteristic close to static characteristic with less fading effects will be considered. In this case, the time-wise change in the error of power level from desired level, i.e., the control amount, is not so much. Therefore, feed-back is provided at an instant earlier than desired instant. Waste is thus involved from the standpoint of minimizing the change in power level with time in one slot.

Now, a propagation channel with fading present therein will be considered. In this case, the received power level change with time may be great, i.e., the control amount may be extremely great. Therefore, feed-back is provided later than the desired instant. With this delay from the desired instant, the forefront of the slot used for the power level calculation occurs during the rise of voltage, thus disabling correct calculation. Signal 2 in FIG. 5(b) corresponds to this case.

What is shown above is the inconvenience encountered in the case of failure of adequate control of the control timing. Furthermore, in the case of using a known pilot signal for the power level calculation, the pilot signal may be too short to obtain correct average power level calculation.

Prior Art 2 shows an invention concerning a gain attenuator control circuit provided in a TDMA radio system, and it is thus set apart from the circuit applied to the CDMA system according to the present invention. Although according to Prior Art 2 a timing signal is generated, it is a signal synchronized to a received slot in the case where received signal peculiar to the TDMA system is a burst signal. That is, the timing signal disclosed in Prior Art 2 is quite irrelevant to the timing control of control amount, which is important according to the present invention.

According to Prior Art 3, time required from the start of transmission by a mobile station till convergence of the transmitted signal power level control is reduced by the power level control based on softly changing control amount in the first time slot from the start of communication. Specifically, In Prior Art 3 base station transmits transmission signal power level control signal of variable control amount to mobile station, and the mobile station controls the transmitted signal power level control in response to the transmitted signal power level control signal. That is, what is disclosed is merely reverse link power level control. Prior art 3 thus is essentially set apart from the control according to the present invention, in which the gain of signal received in own station is controlled to make the received signal power level constant.

According to Prior art 4, although the AGC system is disclosed, like the above Prior Art 2 the communication system as subject is a time division transmission/reception communication system, which is set apart from the CDMA system as the subject of the present invention. Although Prior Art 4 shows the use of timing signal, this signal is for time division transmission and reception, and gain control in the next time slot is performed based on an output obtained by burst section signal power level detection. Thus, the timing signal disclosed in Prior Art 4, like the above Prior Art 2, is quite irrelevant to the control timing of control amount as concerned by the present invention.

SUMMARY OF THE INVENTION

An object of the present invention, accordingly, is to provide a CDMA receiver AGC circuit (i.e., CDMA demodulator), which permits adequately controlling the control timing.

According to a first aspect of the present invention, there is provided an AGC circuit in a CDMA receiver comprising an ACG loop for calculating received signal power level form a received signal and controlling the received signal power level to be constant, wherein the AGC loop includes means for controlling the control timing based on control amount.

According to a second aspect of the present invention, there is provided a CDMA demodulator for receiving and demodulating a spread spectrum signal comprising an AGC loop including an intermediate frequency signal converter for converting the spread spectrum signal to an intermediate frequency signal and an AGC amplifier for variable gain amplifying the intermediate frequency signal with a control voltage, wherein the AGC loop includes a power level calculating unit for calculating the level of full power in the band of a channel under reception.

The power level calculating unit starts the power level calculation from an instant corresponding to the forefront of a slot. The power level calculating unit makes the length of the subject of calculation to be variable. The AGC loop further includes a control unit for calculating control time according to the result of calculation in the power level calculating unit, calculating and controlling the control timing based on control amount and feeding out the control voltage. The power level calculating unit starts the power level calculation from an intermediate part of slot.

According to a third aspect of the present invention, there is provided a CDMA demodulator for receiving and demodulating a spread spectrum signal comprising: an intermediate frequency signal converter for receiving the spread spectrum signal and converting the same signal to an intermediate frequency signal; an AGC amplifier for variable gain amplifying the intermediate frequency signal with a control voltage;

a demodulating unit for demodulating the output signal of the AGC amplifier to a base-band signal; a first low-pass filter for limiting the band of the base-band signal to a band corresponding to one channel and feeding out a first low-pass filter output signal; an A/D converter for quantizing the level of full power in the band of the first low-pass filter output signal and feeding out the quantized signal; a power level calculating unit for averaging the power level of the quantized signal for a predetermined period of time from an instant corresponding to the forefront of slot and feeding out an average power level signal representing the average power level; a control unit for calculating control time based on the average power level represented by the average power level signal and feeding out control data upon reaching of a predetermined instant of time; an A/D converter for converting the control data to an analog control signal; and a second low-pass filter for waveform shaping the along control signal and feeding the control voltage to the AGC amplifier.

According to a fourth aspect of the present invention, there is provided a control timing controlling method adopted in an AGC circuit in a CDMA receiver comprising an AGC loop for computing a received signal power level from a received signal and controlling the received signal power level to be constant, wherein by taking the rise time of the next slot, the instant of start of control is variably set to be earlier than the forefront of the next slot so as to obtain coincidence of the instant of reaching of a desired voltage with the forefront of the next slot.

In the present invention, the control timing is changed based on the control amount, and it is thus possible to obtain stable reception quality. In addition, by causing power level calculation from an instant corresponding to an intermediate part of slot, it is possible to prevent erroneous power level measurement due to voltage rise shortage.

Other objects and features will be clarified from the following description with reference to attached drawings.

PREFERRED EMBODIMENTS OF THE INVENTION

Preferred embodiments of the present invention will now be described with reference to the drawings.

Figure 1:
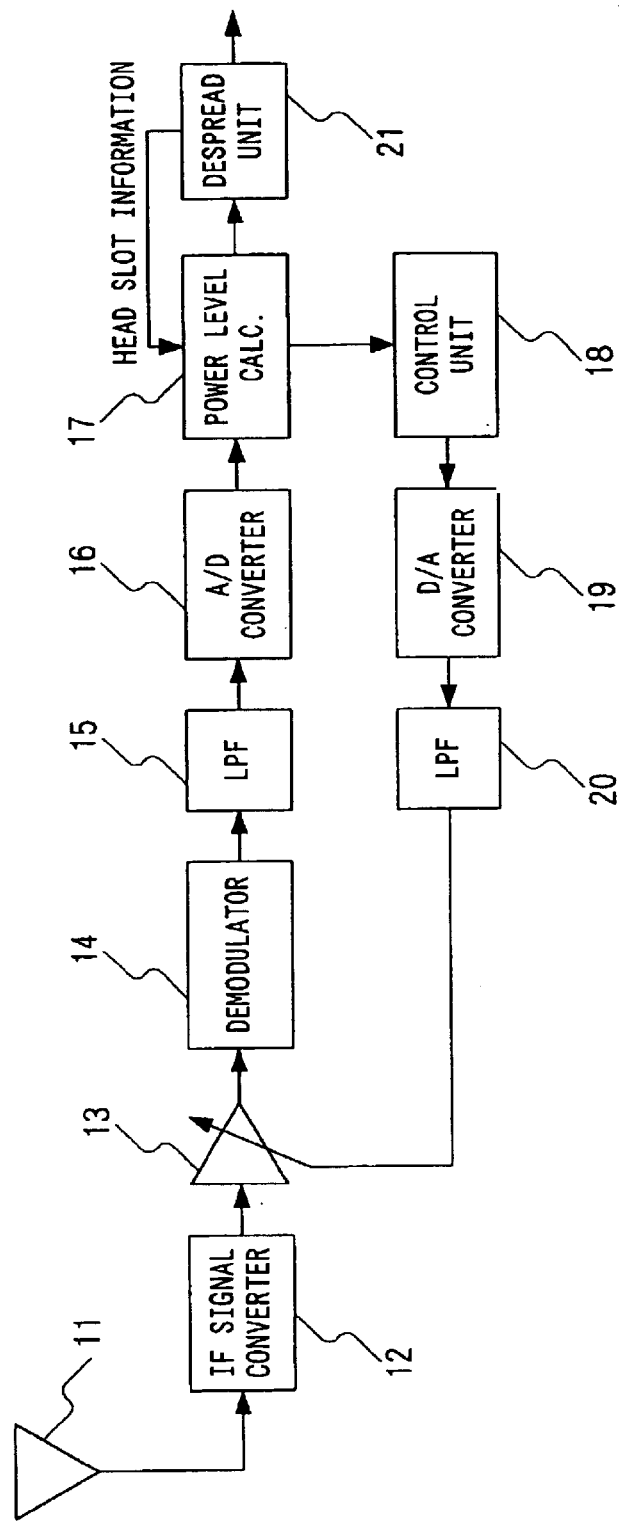
FIG. 1 is a block diagram of a CDMA receiver AGC circuit according to an aspect of the present invention.

An embodiment of the CDMA receiver AGC circuit (or CDMA modulator) according to the present invention will now be described with reference to FIG. 1. The illustrated CDMA receiver AGC circuit (or CDMA demodulator) comprises a transmitting/receiving antenna (hereinafter referred to merely as antenna) 11, an IF signal converter 12, an AGC (automatic gain control) amplifier 13, a demodulator 14, a first LPF (low-pass filter) 15, an A/D (analog-to-digital) converter 16, a power level calculator 17, a control unit 18, a D/A (digital-to-analog) converter 19, a second LPF (low-pass filter) 20 and a despreading unit 21.

The antenna 11 is connected to the IF converter 12. The IF signal converter 12 is connected to the AGC amplifier 13. The AGC amplifier 13 is connected to the demodulator 14. The demodulator 14 is connected to the first LPF 15. The first LPF 15 is connected to the A/D converter 16. The A/D converter 16 is connected to the power level calculator 17. The power level calculator 17 is connected to the control unit 18 and also to the despreading unit 21. The control unit 18 is connected to the D/A converter 19. The D/A converter 19 is connected to the second LPF 20. The second LPF 20 is connected to the AGC amplifier 13.

The AGC amplifier 13, the demodulator 14, the first LPF 15, the A/D converter 16, the power level calculator 17, the control unit 18, the D/A converter 19 and the second LPF 20 together constitute an AGC loop.

As spread spectrum signal (i.e., CDMA signal) received by the antennas 12 passes through the IF signal converter 12 to obtain an IF (intermediate frequency) signal. That is, the IF signal converter 12 converts the spread spectrum signal to the IF signal. The IF signal is amplified in the AGC amplifier 13, the gain of which is variable, with a control voltage to be described later, and then demodulated in the demodulator 14 to a base-band signal. That is, the AGC amplifier 13 amplifies the IF signal in response to the control voltage to feed out an AGC output signal, and the demodulator 14 demodulates the AGC signal to generate the base-band signal.

The first LPF 15 limits the band of the base-band signal to a band corresponding to one channel. The A/D converter 16 quantizes the full power in this band. The power level calculator 17 averages the power level for a given period of time from the forefront of slot, and feeds out the result to the control unit 18. More specifically, the first LPF 15 passes only low frequency components of the base-band signal to feed out a first LPF output signal. The A/D converter 16 quantizes the full power of the first LPF output signal, and feeds out a quantized signal (as digital signal). The power level calculator 17 averages the quantized signal power level for a given period of time from the forefront of slot, and feeds out an average power level signal representing the average power level to the control unit 18.

The control unit 18 calculates control time, and upon reaching of a predetermined time instant, it feeds out control data to the D/A converter 18. More specifically, the control unit 19 calculates the control time based on the average power level represented by the average power level signal, and feeds out the control data, which represents control amount, to the D/A converter 19 at a timing (or time instant) corresponding to the control amount. The D/A converter 19 converts the control data to an analog control signal. The second LPF 20 waveform shapes the output (i.e., analog control signal) of the D/A converter 19, and feeds out the control voltage to the AGC amplifier 13. More specifically, the second LPF 20 passes only low frequency components of the analog control signal, and feeds out a second LPF output signal as control voltage to the AGC amplifier 13.

Slot forefront data is fed out from the despreading unit 21 to the power level calculator 17.

Figure 2:
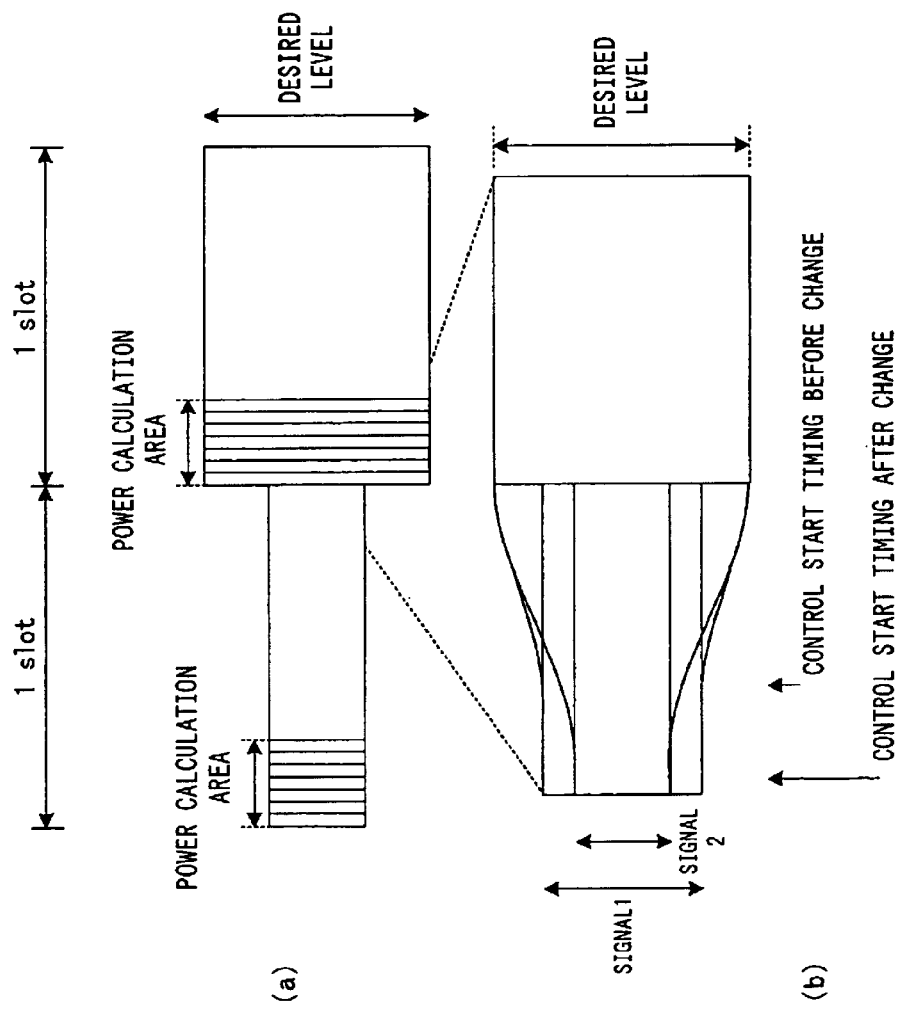
FIGS. 2(a) and 2(b) are timing charts of control timing which is variable based on the control amount in FIG. 1.

The control timing according to the present invention will now be described with reference to FIG. 2. As noted before, it is important to control the control timing. Specifically, the result of calculation of average power level is desirably fed back from an instant corresponding to the forefront of the next slot.

Figure 5:
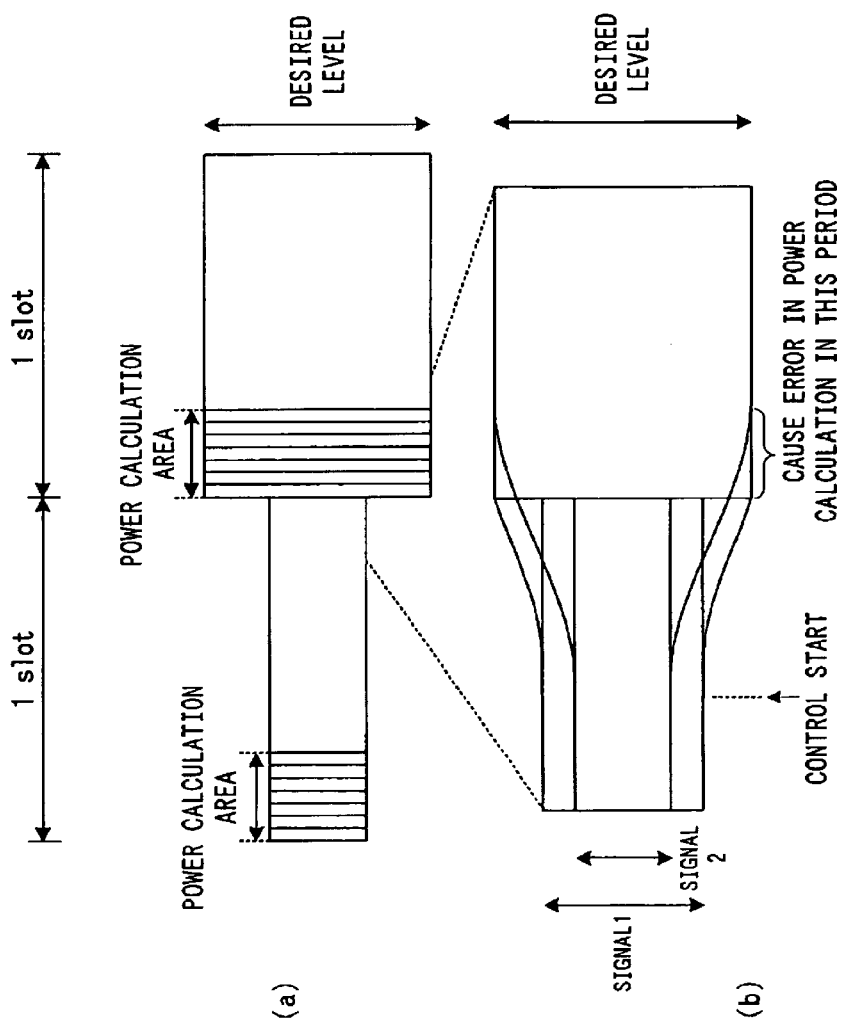
FIGS. 5(a) and 5(b) are timing charts showing the fixed control timing for the control amount.

In FIG. 2(a), two successive slots are shown. These slots are the same as those shown in FIG. 5(a). Again the first slot is referred to as slot 1, and the next slot is referred to as slot 2. The power level calculating unit 17 uses a predetermined period of time for power level calculation. In the control shown in FIG. 2(a), the calculated power level in slot 1 is less than a desired level, and it is thus updated to the desired level from the instant corresponding to the forefront of slot 2. This control is ideal. However, such control is actually impossible.

Actually, as shown in FIG. 2(b), the control involves rising time. Accordingly, by taking the rise time into considerations, the control is started at an instant earlier than the forefront of slot 2 with an aim of obtaining coincidence of the instant of reaching of a desired voltage with the forefront of slot 2. Control of signal 1 in FIG. 2(b) corresponds to this case.

The control is not started at an indiscriminately earlier instant for the following reason. The transmitting side transmits slots at a constant power level. Therefore, a change in the level of power inputted to the demodulator during a slot results in generation of a demodulation error or like undesired result. It is thus intended to minimize control change during the slot. This is the reason for the above.

However, the sum of control change (i.e., amount of correction) is not fixed. Therefore, unless the control timing is changed, the slot forefront used for the power level calculation occurs during the voltage rise as in the case of above signal 2 in FIG. 5(b). In this case, correct calculation can no longer be obtained.

In contrast, according to the present invention the control timing is changed based on the control amount as shown in FIG. 2(b). It is thus possible to provide feed-back always at the same timing (in this example at the forefront of slot).

Figure 3:
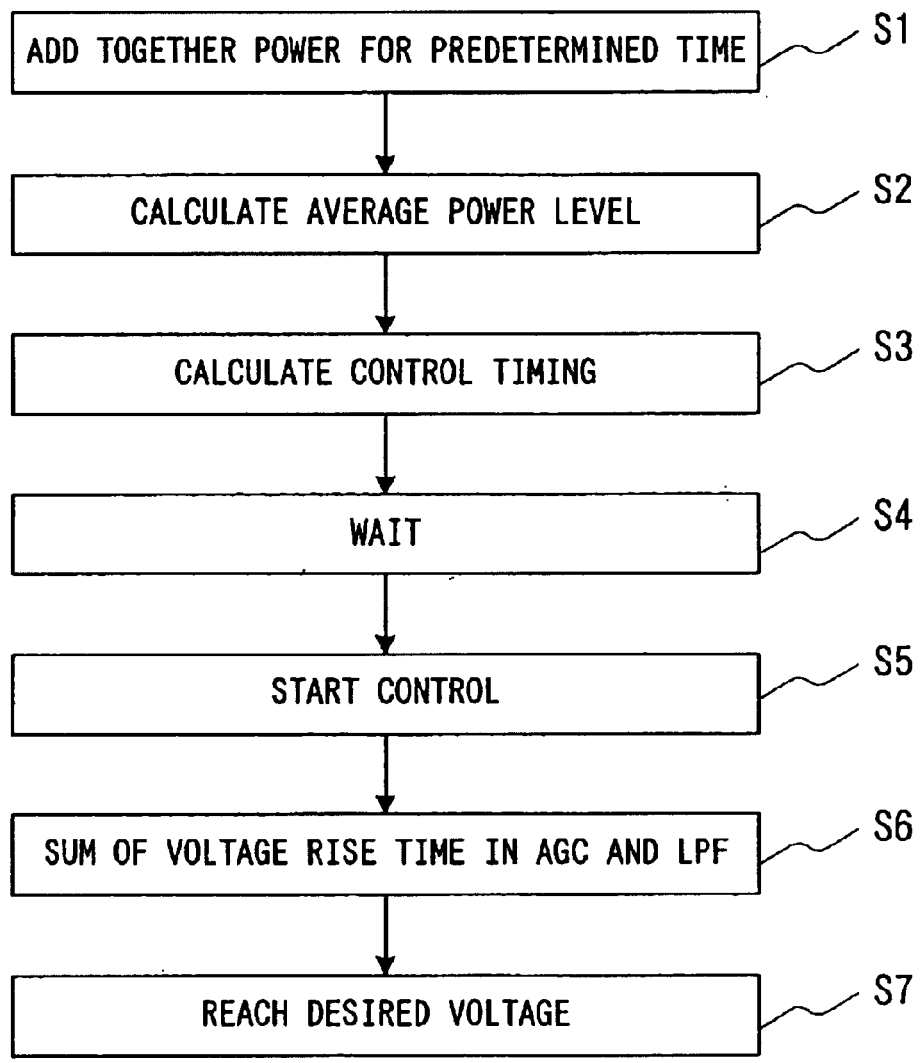
FIG. 3 is a flow chart for the operation of the CDMA demodulator in CDMA receiver AGC circuit if FIG. 1.

The operation of the CDMA demodulator shown in FIG. 1 will now be described with reference to FIG. 3.

The power level calculating unit 17 adds together power for a predetermined period of time (step S1), and then calculates the average power level (step S2). The power level calculation unit 17 thus feeds out an average power level signal representing the average power level to the control unit 18. The control unit 18 calculates control timing based on the average power level (step S3). Then, the control unit 18 waits for a predetermined wait time (step S4), and then starts control by feeding out control data to the D/A converter 19 (step S5). Subsequently after the lapse of the sum of a time necessary for the rise of voltage in the AGC amplifier 13 and the demodulator 14 and a time necessary for the rise of voltage in the first LPF 1 (step S6), the desired voltage is reached by the output of the first LPF 15 (step S7).

Figure 4:
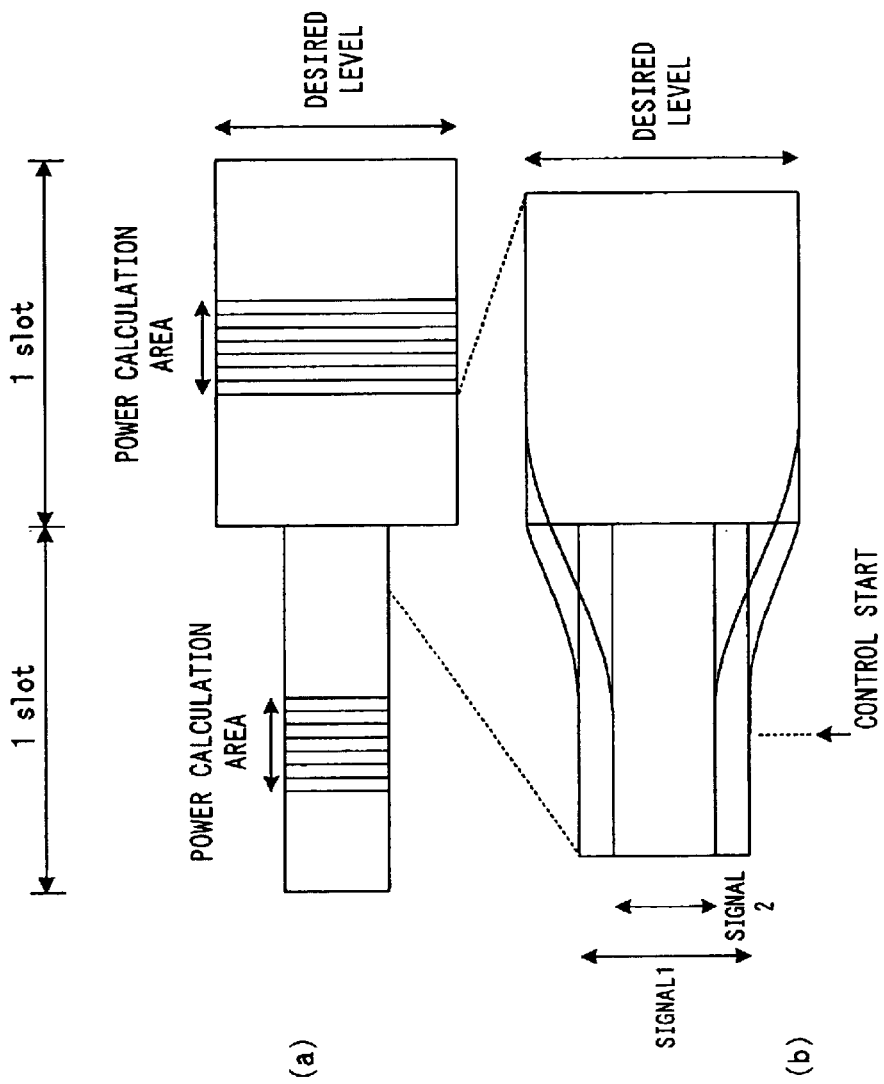
FIGS. 4(a) and 4(b) are timing charts showing an example in which the power calculation of the present invention is executed during the slot.

The embodiment as described above is by no means limitative, and can be variously changed and modified without departing from the scope of the present invention. For example, while in the above embodiment the power level calculating unit 17 starts the power level calculation from the forefront of slot as shown in FIG. 2(a), the calculation may also be started from an intermediate part of slot as shown in FIG. 4(a). By so doing, it is possible to prevent erroneous power level measurement due to voltage rise shortage.

As has been described in the foregoing, according to the present invention the following advantages are obtainable. A first advantage is that it is possible to obtain correct average power level calculation. This is so because full power in the band of the channel under reception is involved in the calculation. A second advantage is that it is possible to obtain stable reception quality. This is so because the control timing is controlled based on the control amount. A third advantage is that it is possible to prevent erroneous power level measurement due to voltage rise shortage. This is so because the power level calculation is started not from the forefront of slot but from an intermediate part thereof.

What is claimed is:

1. An AGC circuit in a CDMA receiver comprising:
an AGC loop operable to calculate a received signal power level from a received CDMA signal and control the received signal power level to be constant, wherein the AGC loop comprises means for determining a portion of the received signal from which the received power level is calculated and wherein further, a length of the determined portion of the received signal is variably controlled based on an amount of gain required by said AGC loop.

2. A CDMA demodulator for receiving and demodulating a spread spectrum signal, comprising:
an AGC loop including an intermediate frequency signal converter for converting the spread spectrum signal to an intermediate frequency signal; and
an AGC amplifier for variable gain amplifying the intermediate frequency signal with a control voltage,
wherein the AGC loop includes a power level calculating unit operable to calculate the level of full power in the band of a channel under reception by averaging the receive power over a predetermined time period, wherein the predetermined time period comprises a continuous portion of a particular slot of the spread spectrum signal.

3. The CDMA demodulator according to claim 2, wherein the power level calculating unit starts the power level calculation from an intermediate part of a slot.

4. A CDMA demodulator for receiving and demodulating a spread spectrum signal comprising an AGC loop including an intermediate frequency signal converter for converting the spread spectrum signal to an intermediate frequency signal and an AGC amplifier for variable gain amplifying the intermediate frequency signal with a control voltage, wherein:
the AGC loop includes a power level calculating unit for calculating the level of full power in the band of a channel under reception, the power level calculating unit starting the power level calculation from an instant corresponding to the forefront of a first slot and stopping the power level calculation at a predetermined instant after the forefront of the first slot, wherein the predetermined instant after the forefront of the first slot is determined based on the gain needed with respect to a desired power level of a second slot.

5. A CDMA demodulator for receiving and demodulating a spread spectrum signal comprising an AGC loop including an intermediate frequency signal converter for converting the spread spectrum signal to an intermediate frequency signal and an AGC amplifier for variable gain amplifying the intermediate frequency signal with a control voltage, wherein:
the AGC loop includes a power level calculating unit for calculating the level of full power in the band of a channel under reception, the power level calculating unit starting the power level calculation from an instant corresponding to the forefront of a slot and making the length of the subject of calculation to be variable, wherein more than one sample within the slot is used in calculating the power level.

6. The CDMA demodulator according to claim 4 or 5, wherein the AGC loop further includes a control unit for calculating control time according to the result of calculation in the power level calculating unit, calculating and controlling the control timing based on control amount and feeding out the control voltage.

7. A CDMA demodulator for receiving and demodulating a spread spectrum signal comprising:
an intermediate frequency signal converter for receiving the spread spectrum signal and converting the same signal to an intermediate frequency signal;
an AGC amplifier for variable gain amplifying the intermediate frequency signal with a control voltage;
a demodulating unit for demodulating the output signal of the AGC amplifier to a base-band signal;
a first low-pass filter for limiting the band of the base-band signal to a band corresponding to one channel and feeding out a first low-pass filter output signal;

an A/D converter for quantizing the level of full power in the band of the first low-pass filter output signal and feeding out the quantized signal;

a power level calculating unit for calculating an average power level of the quantized signal for a predetermined period of time starting from a first instant corresponding to the forefront of a slot and feeding out an average power level signal representing the average power level;

a control unit for calculating control time based on the average power level represented by the average power level signal and feeding out control data upon reaching a second instant of time after the first instant of time, wherein the second instant of time is determined based on a rise time of the AGC amplifier;

an A/D converter for converting the control data to an analog control signal; and a second low-pass filter for waveform shaping the along control signal and feeding the control voltage to the AGC amplifier.

8. A method for controlling the timing of an AGC circuit in a receiver in which signals are received during a plurality of independent slots, the method comprising:

calculating the average power of a received signal corresponding to a first slot;

determining a rise time of the AGC circuit specifically with respect to a second slot;

initiating an AGC control of the second slot based on the calculated average power received in the first slot, wherein the AGC control of the second slot is initiated at a time prior to a beginning of the second slot based on the rise time of the second slot.

9. A method as claimed in claim 8, wherein the AGC control results in the respective power levels of the first and second slots being equal.

10. A method as claimed in claim 8, wherein the average power calculation of the first slot is variably conducted during a predetermined section of the first slot.

11. An AGC circuit for a CDMA receive system, comprising:

a controller operable to calculate a control timing based on an average power level of a portion of a first slot of the intermediate frequency signal and a rise time of an AGC amplifier, wherein the control timing is used to control the AGC amplifier to amplify the intermediate frequency signal such that the AGC amplifier outputs a desired power level at a time corresponding to the beginning of a second slot immediately following the first slot.

12. The AGC circuit of claim 11, wherein the portion of the first slot upon which the control timing is based begins at the beginning of the first slot.

13. The AGC circuit of claim 12, wherein the portion of the first slot upon which the control timing is based ends at a predetermined position prior to the beginning of the second slot.

14. The AGC circuit of claim 13, wherein the beginning and end of the portion of the first slot upon which the control timing is based is determined based on the rise time of the second slot.

* * * * *